J. E. FRIES.
ROTOR FOR SQUIRREL CAGE INDUCTION MOTORS AND METHOD OF SECURING THE WINDING THERETO
APPLICATION FILED AUG. 21, 1918.
1,371,233.
Patented Mar. 15, 1921.
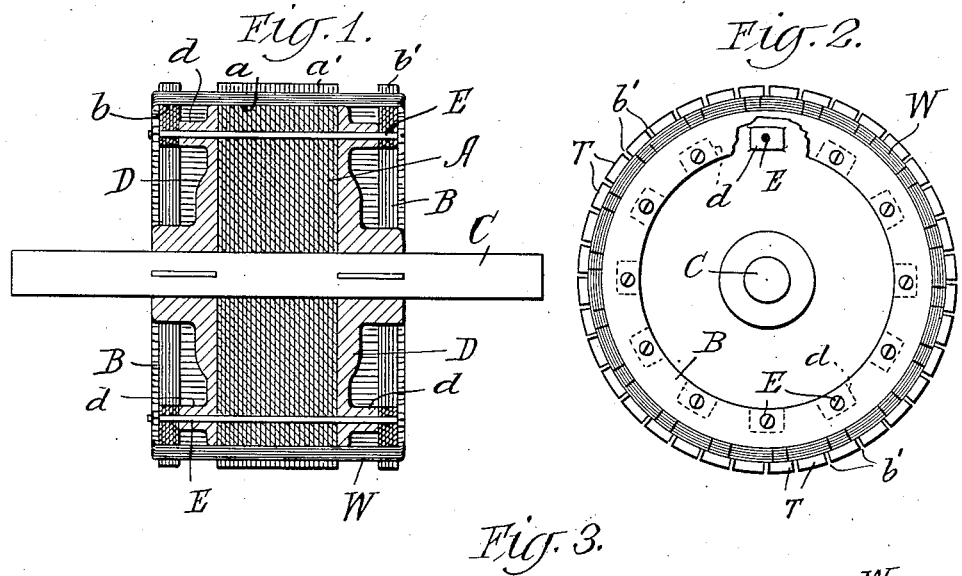
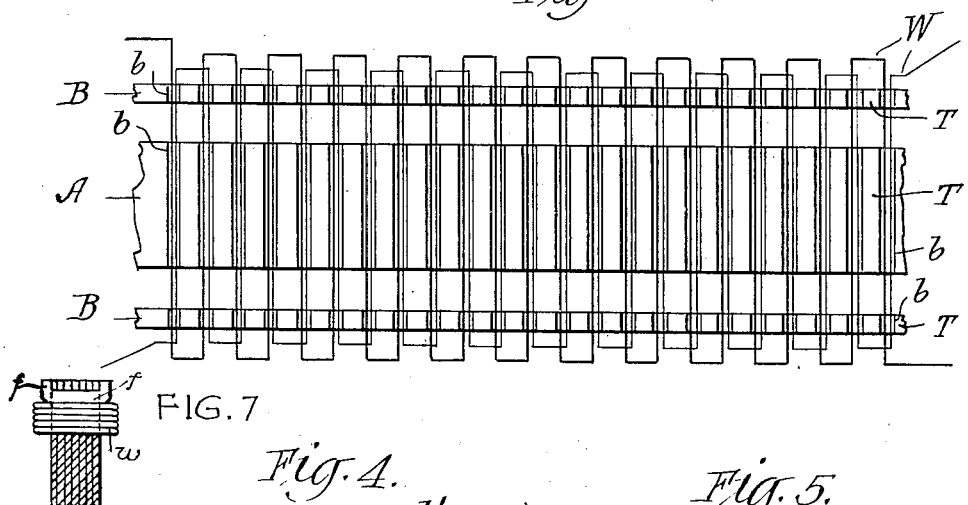
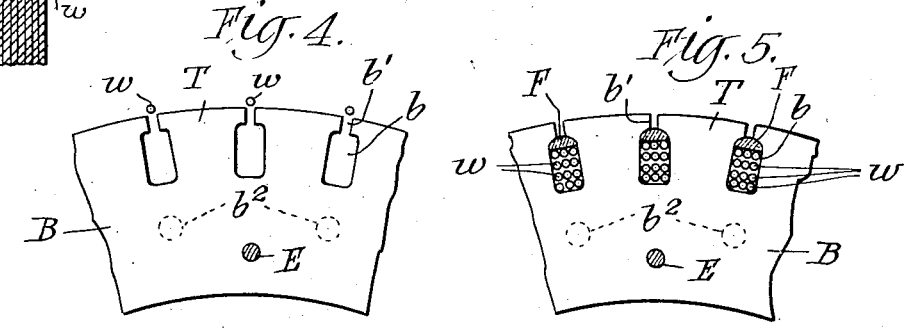
INVENTOR
Joens E. Fries
BY
, ATTORNEY

UNITED STATES PATENT OFFICE.

JOENS ELEAS FRIES, OF BIRMINGHAM, ALABAMA.

ROTOR FOR SQUIRREL-CAGE INDUCTION-MOTORS AND METHOD OF SECURING THE WINDING THERETO.

1,371,233.  Specification of Letters Patent.  Patented Mar. 15, 1921.

Application filed August 21, 1918. Serial No. 250,826.

*To all whom it may concern:*

Be it known that I, JOENS ELEAS FRIES, a citizen of the United States, residing in Birmingham, Alabama, have invented certain new and useful Improvements in Rotors for Squirrel-Cage Induction-Motors and Methods of Securing the Winding Thereto, of which the following is a specification.

The present invention relates to the method of forming and securing the winding on the rotors of squirrel cage induction motors and to producing a rotor of improved construction in which screws and other mechanical joints are dispensed with in securing the winding in place. A further feature of the invention is the improved construction of the end rings and the inexpensive method of forming them by electrically spot-welding several duplicates of the punchings of which the laminated rotor is constructed.

The objects and advantages of the invention will be apparent from the following specification and particularly pointed out in the subjoined claims.

Ever since squirrel cage induction motors first came into use, many different methods of short circuiting the copper conductors threading the slots of the rotor have been devised and tried with more or less success. The copper conductors have been fastened to end-rings by means of screws, rivets or solder. It has been tried to cast conductors and end-rings in one operation in their proper place, forming a grill work of copper without joints interlinking the iron circuit. This method was abandoned as impractical and too expensive. Electrically welding the conductors to the end-rings is now extensively in use but is expensive, and is not wholly satisfactory, because of the tendency for the bars to break off at the point of connection with the end-rings, due to change in cross-section and to repeated changes in temperature. Screws fall out and rivets loosen until contact surfaces corrode, overheating and ultimately sparking and burnouts occur.

In all these cases the conductors extend outside of the slots through the rotor-laminæ and with their attached end-rings rotate in the air producing a fan effect which forms an essential part of the cooling system of the motor.

My invention provides a rotor having a squirrel cage winding which is secured in place without the use of numerous soldered, welded, cast or other joints such as obtained by the use of screws, rivets or the like.

Referring to the drawings in which like characters refer to like parts in the several views.

Figure 1 is a central longitudinal section of a rotor built in accordance with my invention, the winding being shown somewhat diagrammatically and certain wedges being omitted;

Fig. 2 is an end view of Fig. 1;

Fig. 3 is a diagrammatic development of the periphery of the rotor and end-rings illustrating the method of applying the winding;

Figs. 4 and 5 are fragmentary detail views on an enlarged scale showing the end-rings before and after the winding is secured in place;

Fig. 6 is a plan of a portion of one of the end-rings partly broken away to show the spot-weld securing the adjacent laminæ.

Fig. 7 is a detail illustrating one of the wedges for securing the winding in place.

The rotor consists essentially of a drum A, end-rings B and a rotor shaft C. The drum and end-rings may be either solid or laminated as shown. In the construction shown the drum laminæ are positioned by heads D which are keyed or otherwise secured in place on the rotor shaft C. The end-rings B are spaced away from the drum by lugs $d$ formed on the heads D, and are secured in place by through-bolts E. These bolts also pass through suitable apertures in the laminæ of the drum, thus serving to clamp the laminæ of the drum and the end-rings firmly together and also to aline the slots $a$ and $b$ formed respectively in the drum and end-rings.

The end-rings B are conveniently made up from punchings that are duplicates of those employed in forming the laminated drum A, therefore the slots $a$, $b$ of all the laminæ are identical in size and shape. The outer ends or throats of the slots $a$ and $b$ are of reduced size as shown at $a'$, $b'$ in Figs. 1, 4 and 5, the width of these throats being just sufficient to permit of the passage of the copper conductors $w$ forming the winding W. The laminæ of both the drum A and end-rings B of the rotor are securely clamped together by the bolts E so as to form a single structural unit having alined slots therein which are adapted to receive the squirrel cage winding.

The winding W is secured in place by passing the wire or wires thereof back and forth longitudinally (as shown in Fig. 3) around the teeth T formed in the rings and the drum between the adjacent slots. The winding used is a copper conductor $w$ of such diameter that it can freely pass through the throats $a'$, $b'$ of the slots $a$ and $b$ formed in the drum A and the rings B. When winding, the wire W is passed through the throats $a'$ $b'$ from above without the necessity of threading it through the slot as would be the case if the slots were closed. The wire is then simply bent around one tooth T in the laminæ, inserted in the next slot, and so on in sinuous or "zig zag" fashion around the rotor. With an odd number of slots each succeeding wire in any slot will thread that slot in opposite direction, thus making a closed squirrel cage winding as shown. All necessary crossings of wire take place between the slots on the outer sides of the rings as shown in Fig. 3.

In order to secure the necessary ventilation parts of the conductors are exposed to the air, as in conventional designs. For this purpose the two rings are held as shown in Fig. 1 in spaced relation from the main body of the rotor by the lugs $d$. These rings have slots $b$ similar to and in alinement with the slots in the rotor laminæ. The rings may be made of solid metal, they may be made separate, or they may form a part of the heads D which clamp the laminæ together; however, these rings for the sake of economical production are preferably built up of a few duplicates of the rotor laminæ, so that they already have the slots punched therein. The centers of these laminæ are punched out by using some standard blanking die in the factory, so as to admit air between the rings and the main rotor body. In order to stiffen these rings against the pull of the winding the laminæ in said rings are spot-welded together in several places, as shown at $b^2$ in Figs. 4, 5 and 6. The conductors bridging the gap between the rotor drum and the rings serve the customary purpose of fan blades and the spacers $d$ between the rings and the heads D contribute to the fan effect.

When the slots in the drum A have been filled by the copper wire to the desired extent, hard wood or fiber wedges F are driven into the slots on top of the conductors, thus aiding the overhanging teeth T in holding them tight in the slots and preventing them from being thrown out through the narrow throats. In the rings, steel or copper wedges, F', Fig. 7, are preferably used, as such wedges may be prevented from dislocation axially by turning over their projecting ends $f$.

In the rings, there can be no objection to filling the small spaces between the wires, the wedges and the walls of the slots with hard solder, as this will make the design more compact mechanically and does not introduce any soldered joints transverse to the path of current.

If a high resistance winding is desired, it may easily be secured by employing phosphor-bronze wire or wire of other alloys.

A squirrel cage rotor constructed as above described and wound in the manner set forth does away entirely with the necessity of using numerous soldered, welded, riveted or screwed joints and overcomes many of the practical difficulties encountered in the use of rotors of this class. It is believed that the method of applying the winding and securing it in place on the rotor is broadly new as are also the several structural features set forth and particularly pointed out in the appended claims.

What I claim is—

1. A rotor for induction motors comprising a drum portion, rings spaced away from but secured to said drum, the drum and rings having longitudinally extending slots formed therein and a winding seated in said slots and passing around the teeth formed between the slots.

2. A rotor for induction motors comprising a drum portion, rings spaced away from but secured to said drum, the drum and rings having registering slots formed therein and a winding passing through said slots and wound around the ends of the teeth formed between the slots in said rings.

3. A rotor for induction motors comprising a drum, rings spaced away from but secured to said drum, said drum and rings having alined slots formed therein and a winding comprising a continuous wire passing sinuously through adjacent slots in the rotor and rings substantially as described.

4. In a rotor for squirrel cage induction motors, end-rings spaced away from the body of the rotor having slots formed therein to receive the winding, said rings being electrically spot welded to one another and formed of duplicates of the laminæ of the rotor with their centers removed.

5. A rotor comprising a drum formed of slotted laminæ, end-rings formed of similarly slotted laminæ, heads engaging the ends of the drum and provided with lugs engaged by the end-rings and serving to space them from the drum and means passing through said lugs for securing said parts together in the positions stated.

In witness whereof, I have hereunto signed my name.

JOENS ELEAS FRIES.